United States Patent [19]

Chen

[11] 4,279,747
[45] Jul. 21, 1981

[54] RAPID CONTINUOUS CLARIFIER

[75] Inventor: Henry Chen, Pingtung, Taiwan

[73] Assignee: Fabcon Incorporated, San Francisco, Calif.

[21] Appl. No.: 112,778

[22] Filed: Jan. 17, 1980

[51] Int. Cl.³ ............................................. B01D 21/14
[52] U.S. Cl. .................... 210/197; 210/520; 210/522; 210/528
[58] Field of Search ............... 210/515, 519, 520, 523, 210/525, 528, 20, 533–537, 197, 195.3, 522, 261, 262

[56] References Cited

U.S. PATENT DOCUMENTS

| | | | |
|---|---|---|---|
| 2,103,829 | 12/1937 | Seip | 210/20 |
| 2,141,371 | 12/1938 | Bach | 210/528 |
| 2,343,836 | 3/1944 | Weber | 210/528 |
| 2,443,686 | 6/1948 | Malmgren | 210/537 |
| 2,488,851 | 11/1949 | Copp | 210/520 |
| 3,523,889 | 8/1970 | Eis | 210/20 |
| 3,892,666 | 7/1975 | Quast | 210/520 |

Primary Examiner—Benoît Castel
Attorney, Agent, or Firm—Townsend and Townsend

[57] ABSTRACT

Apparatus for clarifying the liquid portion of a slurry such as preflocculated sugar juice is disclosed. A tank is provided, and a downwardly opening conical tray is located within the tank to divide the tank into upper and lower portions. The outer periphery of the tray is spaced from the interior of the tank to provide an annular passageway therebetween. A vertical pipe is centrally located within the upper portion of the tank, and has an open bottom above the tray. Slurry to be clarified is supplied inside the vertical pipe. The slurry flows out through the open bottom of the vertical pipe to the upper portion of the tank outside the vertical pipe. At least some of the liquid portion of the slurry rises through the sedimented mud of the slurry and collects in the upper portion of the tank outside the vertical pipe above the level of the tank outside the vertical pipe above the level of the mud. Some of the slurry flows downwardly through the passageway between the tray and the tank into the lower portion of the tank. The remaining liquid portion of the slurry in the lower portion of the tank rises through the sedimented mud and collects immediately beneath the tray. Collected liquid from both the upper and lower portions of the tank is withdrawn from the tank.

4 Claims, 3 Drawing Figures

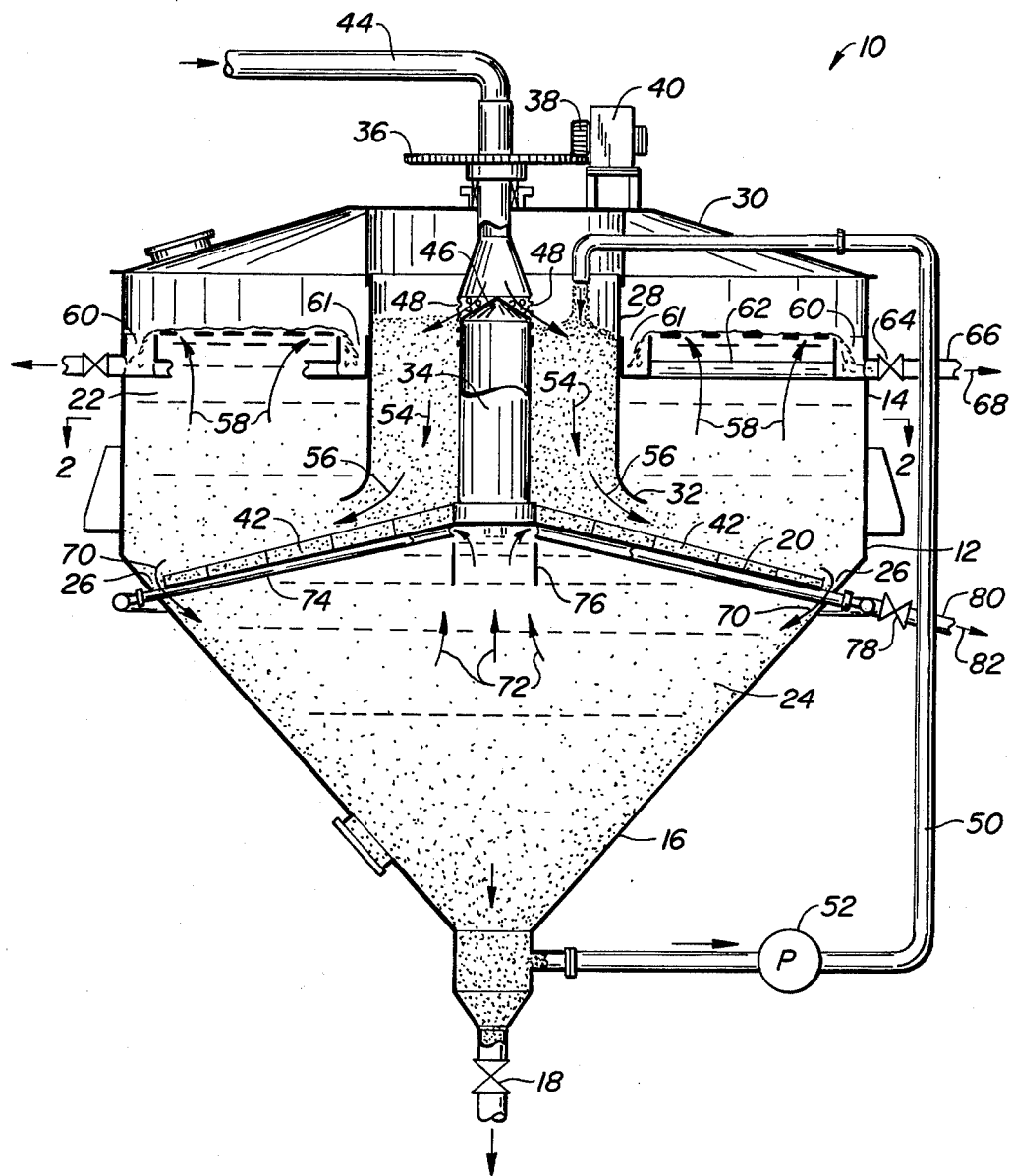
FIG._1.

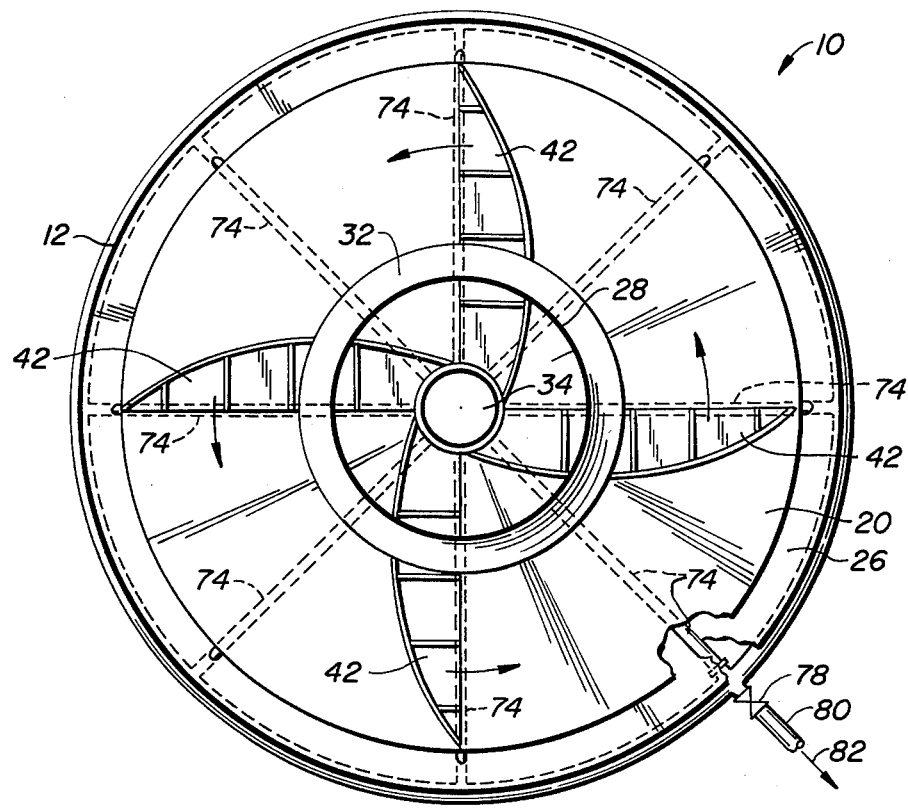
FIG._2.
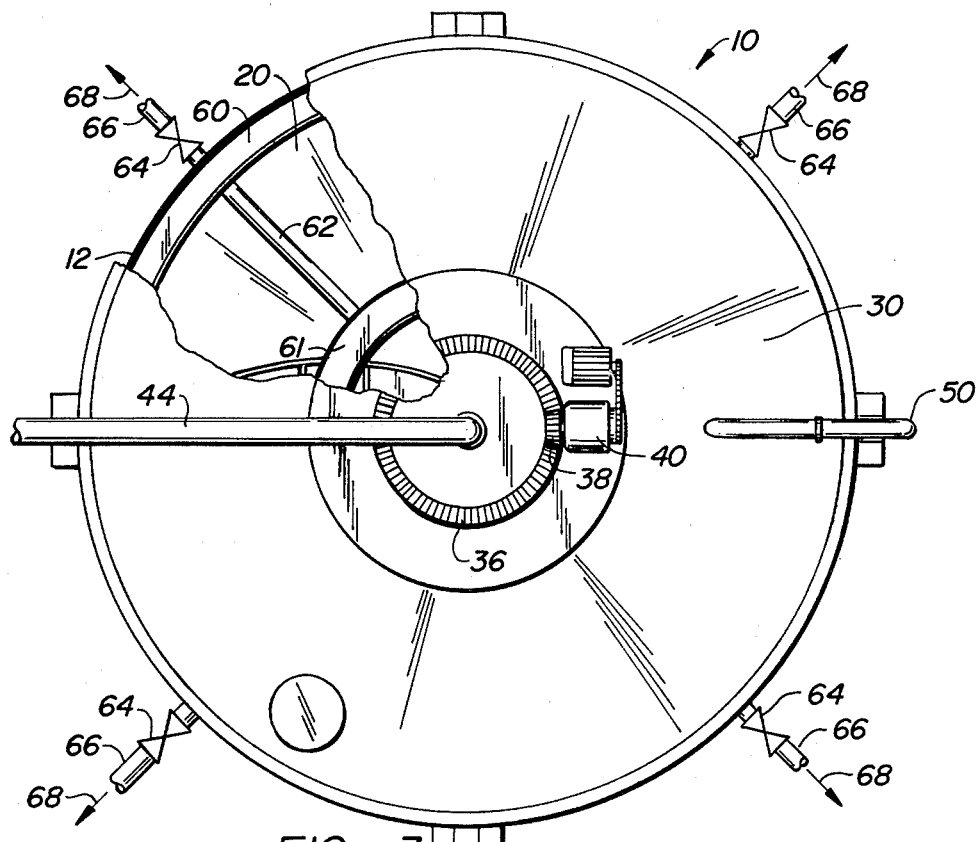
FIG._3.

RAPID CONTINUOUS CLARIFIER

BACKGROUND OF THE INVENTION

The present invention relates to apparatus for the clarifying of the liquid portion of a slurry through settling and filtration.

A typical situation in which the liquid portion of a slurry is to be clarified and separated from suspended solids is found in the processing of sugar juices. In the past, such juices were clarified by pouring the juice into a large sedimentation tank, and allowing the juice to remain in the tank a sufficient time for the solid particles to collect in the bottom. Typically, the juice spends about 2 or 3 hours in the tank, and the process is relatively inefficient in that large storage tanks are required to handle the requisite volume. In addition, the fact that the juice sits in the tank with the sediment for a relatively long period of time often causes the juice to take on the coloration of the sediment, decreasing the quality of the juice obtained.

Clarification systems are now under development in which the juice is flocculated prior to clarification. Preflocculation causes the solid particles in the juice to accumulate into larger particles, called flocs. Such flocs are typically heavier than the juice, and fall to the bottom, causing a filtering action on the juice. Such preflocculated juices separate more rapidly into the clarified juice and sediment, and the use of such preflocculated juices in conventional sedimentation tanks is quite inefficient.

Attempts have been made to develop clarifying systems which operate more rapidly than the sedimentation tanks to accommodate preflocculated juices. The patent to Eis, U.S. Pat. No. 3,523,889, discloses such a rapid clarifier. Such clarifiers are produced by Enviro-Clear, a division of Amstar Corporation, and a similar type of system has been tested by the Sugar Research Institute. These rapid clarifiers all employ a large tank which contains a mat of sedimented mud particles with an overlying layer of the clarified juice. The preflocculated juice to be clarified is introduced in the tank at a level below the mud level. The liquid portion of the juice rises through the existing mud while the flocs descend. The rising liquid is thus clarified by settling of the flocs and also the filtering action provided by the mud. Sedimented mud is drawn out of the bottom of the tank, and clarified juice is skimmed off the top.

The rapid clarifiers described above have been plagued by "short circuiting" of the slurry to be clarified. A portion of the slurry injected in the tank rises rapidly through the mud, rather than the slow, gradual ascending movement desired. The rapid rise of such slurry prevents the flocks from settling, and inhibits the filtration action of the sedimented mud. The poorly settled and filtered slurry contaminates the clarified juice collected at the top of the tank. This problem can be reduced by lowering the input volume of the slurry, but only at a substantial reduction in the capacity of the system.

SUMMARY OF THE INVENTION

The present invention provides improved apparatus for clarifying the liquid portion of a slurry such as preflocculated sugar juice. A tank is provided, and a downwardly opening conical tray is located within the tank to divide the tank into upper and lower portions. The outer periphery of the tray is spaced from the interior of the tank to provide an annular passageway therebetween. A vertical pipe is centrally located within the upper portion of the tank, and has an open bottom above the tray. Slurry to be clarified is supplied inside the vertical pipe. The slurry flows out through the open bottom of the vertical pipe to the upper portion of the tank outside the vertical pipe. At least some of the liquid portion of the slurry rises through the sedimented mud of the slurry and collects in the upper portion of the tank outside the vertical pipe above the level of the mud. Some of the slurry flows downwardly through the passageway between the tray and the tank into the lower portion of the tank. The remaining liquid portion of the slurry in the lower portion of the tank rises through the sedimented mud and collects immediately beneath the tray. Collected liquid from both the upper and lower portions of the tank is withdrawn from the tank.

The present invention provides a two-stage clarification system, clarified liquid being obtained and collected in both stages. Clarification in the upper portion of the tank can proceed relatively rapidly, because it need not be 100% efficient. The juice not collected in the upper portion of the tank is mostly recovered in the lower portion.

In the present invention, it is preferred that a portion of the sedimented mud be recycled from the bottom of the tank to the top of the tank inside the vertical pipe, and mixed with the incoming slurry. The slurry should be introduced at above the level of the collected juice outside the vertical pipe to inhibit turbulence. The slurry and mud mixture must pass downwardly through the vertical pipe and out the bottom of the vertical pipe, at which point the liquid portion of the slurry can rise to the top of the tank. As a result, it is not possible for the slurry to short circuit from its input location to the top of the tank and contaminate the clarified juice.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a cross-sectional elevation view of the preferred embodiment of the clarifier of the present invention;

FIG. 2 is a sectional view taken along lines 2—2 of FIG. 1;

FIG. 3 is a partially broken away plan view of the apparatus of FIG. 1.

DESCRIPTION OF THE PREFERRED EMBODIMENT

The preferred embodiment 10 of the apparatus of the present invention is illustrated by way of reference to FIGS. 1–3 in combination. A vessel or tank 12 is provided which is circular in section. Tank 12 includes a cylindrical upper section 14, and an upwardly opening conical section 16 which meets with the cylindrical section. A valve 18 controls drainage at the bottom of tank 12.

A tray 20 is located within tank 12. Tray 20 has a shallow, downwardly opening conical shape, and its outer periphery terminates at the junction of cylindrical and conical sections 14, 16, respectively, of tank 12. Tray 20 divides tank 12 into an upper section 22 and a lower section 24, connected by a narrow passageway 26 around the periphery of the tank.

A vertical pipe 28 is centrally located in the upper portion 22 of tank 14. Vertical pipe 28 is suspended from a cover 30 overlying the tank. The bottom of vertical pipe 28 spreads out in the form of a bell mouth 32.

A rotated pipe 34 is located within vertical pipe 28. Circular gear tooth rack 36 is attached to the upper end of rotated pipe 34. A spur gear 38 engages rack 36, and is rotated by a motor 40. A plurality of mud scrapers 42 are fixed to the bottom of rotated pipe 34, and the rotation of pipe 34 causes simultaneous rotation of mud scrapers 42.

A feed pipe 44 for a slurry to be processed connects with the upper end of rotated pipe 34. For example, the slurry can comprise a preflocculated sugar juice in which the liquid portion of the juice is mixed with solid particles which have been coagulated into flocs. Although the present invention is usable in connection with other types of slurries, the preferred embodiment will be discussed herein below with respect to preflocculated juices such as sugar juice.

Rotated pipe 34 includes a conical deflector plate 46 located immediately beneath a plurality of apertures 48. The preflocculated juice entering through pipe 44 passes downwardly through rotated pipe 34 and exits the rotated pipe at apertures 48.

A return pipe 50 communicates with the bottom of tank 12. A pump 52 in pipe 50 forces the sediment from the bottom of tank 12 upwardly through pipe 50, and dispenses it within vertical pipe 28 near apertures 48. As a result, a mixture of sediment and preflocculated juice is provided near the upper end of vertical pipe 28.

The mixture of preflocculated juice and sediment passes downwardly through vertical pipe 28, as indicated by arrows 54. When the mixture reaches the bottom of vertical pipe 28, it passes downwardly and outwardly through the bell mouth 32, as illustrated by arrows 56, into the upper portion 22 of tank 12 circumscribing vertical pipe 28.

The liquid portion of the preflocculated juice tends to rise upwardly in the upper portion 22 of tank 14, as illustrated by arrows 58. The flocs in the juice tend to settle, and the settled flocs form a sedimented "mud" overlying tray 20. The upper level of the mud within the upper portion 22 of tank 12 provides a filtering action on the juice as it rises. This filtering action, together with the natural settling of the flocs in the juice, causes a clarifying action, and the clarified juice collects at the top of the upper portion 22 of tank 12 circumscribing the outer periphery of vertical tank 28.

A pair of circular troughs 60, 61 are located within the upper portion 22 of tank 12. The collected clarified juice is collected in troughs 60, 61 which are interconnected by conduit 62. A valve 64 allows the collected clarified juice to be withdrawn through conduit 66, as illustrated by arrow 68.

Rotating mud scrapers 42 prevent the sedimented mud from solidifying on top of conical tray 20. Scraper 42 rotates at about 0.2 rpm so that the mud is lifted from tray 20 without agitating the contents of tank 12. A portion of the sedimented mud passes downwardly into the lower portion 24 of tank 12 through passage 26, as illustrated by arrows 70.

The sedimented mud collected in the lower portion 24 of tank 12 still contains a certain amount of trapped liquid. As the sedimented mud collects within the lower portion 24 of tank 12, most of the remaining liquid portion of the juice rises, as illustrated by arrows 72. This rising juice collects in a small container 76 located immediately beneath the center of tray 20. Conduits 74 are provided to withdraw the collected juice from container 76. A valve 78 controls the passage of the collected juice through a conduit 80, as illustrated by arrow 82.

In operation, a continuous stream of a slurry, such as preflocculated sugar juice, is supplied through conduit 44. The juice passes outwardly through apertures 48 in a rotated pipe 34, into vertical pipe 28. The preflocculated juice is mixed with recycled mud in the upper portion of vertical pipe 28.

The mixture of preflocculated juice and recycled mud passes downwardly through vertical pipe 28, and outwardly into the upper portion of tank 12. The liquid portion of the juice rises through the existing mud layer, while the flocs settle, to clarify most of the liquid portion of the juice. The settled mud in the upper portion 22 of tank 12 passes downwardly through passageway 26 into the lower portion 24 of the tank. In lower portion 24, the remaining liquid portion of the juice is collected. A portion of the sedimented mud is recycled through pipe 50, and the remainder is discharged through valve 18.

It is readily apparent that the apparatus of the present invention includes two separate clarifying stages. Processing of the slurry in the initial stage can be relatively rapid, taking full advantage of the rapid settling characteristics of a preflocculated juice. Because of the rapid processing, a certain amount of liquid is trapped in the sedimented mud, which passes into the lower portion of the tank, and this liquid is collected in the second clarifying stage.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. Apparatus for clarifying the liquid portion of a slurry such as preflocculated sugar juice, said apparatus comprising:
   a tank including an upwardly opening conical lower section and a cylindrical upper section;
   a downwardly opening conical tray located within the tank and dividing the tank into upper and lower portions at approximately the juncture of the conical section and the cylindrical section, the outer periphery of the tray being spaced from the interior of the tank to provide an annular passageway therebetween;
   a vertical pipe centrally located within the upper portion of the tank and having an open bottom above the tray;
   a rotated pipe located within the vertical pipe, said rotated pipe including a deflector cone within the pipe and a plurality of apertures in the side wall of the rotated pipe immediately above the deflector cone;

a plurality of mud scrapers attached to the rotated pipe and disposed immediately above the conical tray;

means for supplying a slurry to the upper end of the rotated pipe so that the slurry flows out of the rotated pipe through the apertures and into the vertical pipe;

means for supplying mud inside the vertical pipe so that the mud and slurry are mixed within the vertical pipe and flow out through the open bottom of the vertical pipe to the upper portion of the tank circumscribing the vertical pipe, at least some of the liquid portion of the slurry rising through the mud and collecting in the upper portion of the tank around the vertical pipe above the level of the mud, some of the slurry flowing downwardly through the passageway between the tray and the tank into the lower portion of the tank where substantially the remaining liquid portion rises through the mud and collects immediately beneath the center of the tray;

means for withdrawing the collected liquid from the upper and lower portions of the tank; and a mud outlet at the bottom of the tank.

2. The apparatus of claim 1 and additionally comprising means for circulating mud from the bottom of the tank to a position inside the vertical pipe so that the recirculated mud is mixed with the slurry.

3. The apparatus of claim 1 wherein the vertical pipe has a bell mouth at its lower end.

4. The apparatus of claim 1 wherein the withdrawing means comprises an upwardly opening trough at the collected liquid level in the upper portion of the tank adapted to receive the liquid collected in the upper portion of the tank, and a pipe leading from outside the container to a point immediately beneath the center of the conical tray to receive the liquid collected in the lower portion of the tank.

* * * * *